United States Patent Office 3,125,594
Patented Mar. 17, 1964

3,125,594
PROCESS FOR THE PREPARATION OF HALO-
GENATED ORGANIC COMPOUNDS
Karl W. Hubel and Emile Henri Braye, Brussels, Belgium,
assignors to Union Carbide Corporation, a corporation
of New York
No Drawing. Filed Mar. 31, 1960, Ser. No. 18,808
Claims priority, application Great Britain Apr. 7, 1959
10 Claims. (Cl. 260—448.2)

This invention relates to the preparation of organo-metallic compounds and to products resulting therefrom. More particularly, it relates to a process for the preparation of partially or completely halogenated linear or cyclic organic compounds.

The present invention greatly facilitates the synthesis of substituted or unsubstituted organic compounds in that it provides a new and general one-step method for this purpose. The invention is predicated upon the discovery that when certain organo-metallic complexes, as hereinafter described, whose organic part contains a preformed carbon skeleton, are reacted with compounds containing at least one element or reactant capable of forming stable bonds with the skeleton, the bonding of the element to the skeleton is readily achieved. The compounds formed thereby are characterized as containing at least one of the carbon skeletons and at least one of the elements.

Although the mechanism of the reaction is not fully understood, basic considerations applying to the inventive process can be found in the following discussion. It is believed that organo-metallic complexes as for example, $Fe_2(CO)_6(RC_2R)_2$ or $Fe_2(CO)_7(RC_2R)_2$ can be represented by the structures respectively shown below, wherein the actual meaning of R has been disregarded for the sake of clarity.

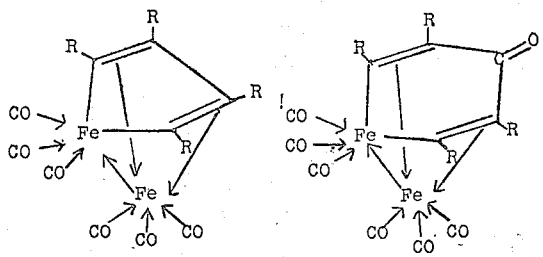

There are various evidences which indicate that the two iron atoms contained in these organo-metallic complexes have different chemical behavior. In particular it has been found that the iron atom bonded into the ring system can be more readily removed than the other iron atom. It can thus be foreseen that the splitting of the iron atoms which occurs during the reaction isolates a highly reactive carbon skeleton which can readily react with any element capable of forming stable bonding with that carbon skeleton. Similar considerations apply to the various organo-metallic complexes containing only one metal atom or one (R'C_2R") group and apply as well to the complexes having a larger number of metal atoms or (R'C_2R") groups in their structure. It is therefore apparent that by properly selecting the reactant containing an element capable of forming stable bondings with the carbon skeleton, a large variety of organic compounds can be provided.

According to this invention, a process for the preparation of partially or completely halogenated linear or cyclic organic compounds comprises reacting an organo-metallic complex having the formula:

with a halogenation reagent. In the above referred to organo-metallic complexes, M represents a transition metal belonging to the VI, VII or VIII sub groups of the periodic table, CO represents a carbonyl group, R' and/or R" may be the same or different and represent hydrogen, halogeno, carboalkoxy, alkyl, aryl, cycloaliphatic, alkoxy or silyl groups and the like, including the substituted derivatives thereof, $C_2$ represents a carbon-to-carbon bonding, B represents a member selected from the group consisting of hydrogen, mercury, halogen, alkyl, aryl or acyl, $x$ represents an integer of from 1 to 4, $y$ represents an integer from 1 to 10, $z$ represents an integer of from 1 to 6, and $w$ represents an integer of from 0 to 4.

For the purposes of this invention, the periodic table herein referred to is contained on pages 392 and 393 of The Handbook of Chemistry and Physics, 37th edition, published by the Chemical Rubber Publishing Co.

Typical organo-metallic complexes suitable for use in the process of this invention include: $Fe_2(CO)_6(RC_2R')_2$, wherein R represents a phenyl or ethyl group or a hydrogen atom and wherein R' represents a phenyl, methyl, ethyl or methoxy group or a hydrogen atom;

$$Fe_2(CO)_8(RC_2R')_2(B)_2$$

wherein R and R" represent hydrogen, and B represents either hydrogen or a methyl rest. These complexes may be represented by the following structure.

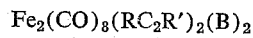

$Fe_2(CO)_7(RC_2R')_2$, wherein R and R' represent phenyl groups. This complex may be represented by the following structure:

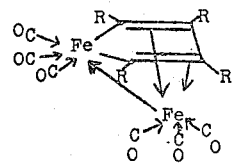

$Fe_2(CO)_6(RC_2R')$, wherein R and R' represent phenyl groups. This complex may be represented by the following structure:

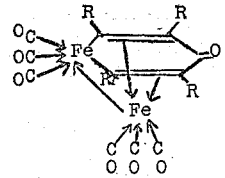

$Fe(CO)_4(RC_2R')_2$, wherein R represents a phenyl group and wherein R' represents a phenyl group or a hydrogen atom. This complex may be represented by the following structure:

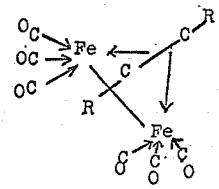

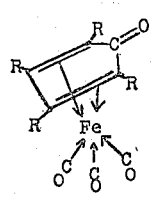

$Fe(CO)_6(RC_2R')$, wherein R represents a hydrogen atom or a phenyl group and wherein R' represents a hydrogen atom. This complex may be represented by the following structure:

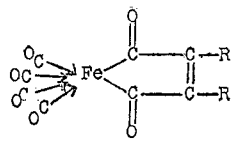

$Fe_3(CO)_8(RC_2R')_2$, wherein R and R' represent phenyl groups. This complex may be represented by the following structure:

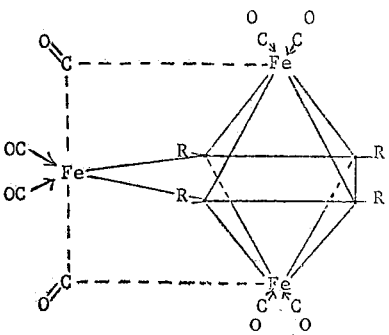

$Fe_2(CO)_6(RC_2H)_3$, wherein R represents a phenyl group. This complex may be represented by the following structure:

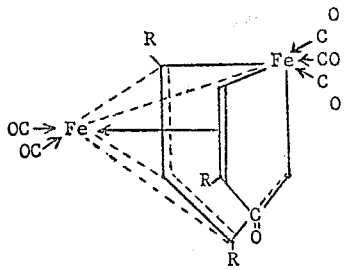

$Fe(CO)_4(RC_2H)_3$, wherein R represents a phenyl group or a hydrogen atom. This complex may be represented by the following structure:

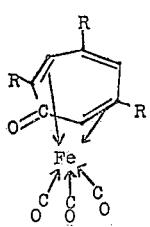

$Co_2(CO)_6(RC_2R')$, wherein R represents a phenyl group and R' represents a phenyl group or a carbomethoxy group. This complex may be represented by the following structure:

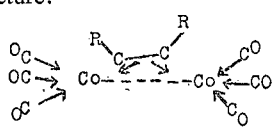

$Co_2(CO)_4(RC_2R')_3$, wherein R represents a carboethoxy or methyl group or a hydrogen atom and wherein R' represents a phenyl group or a trimethylsilyl group. This complex may be represented by the following structure:

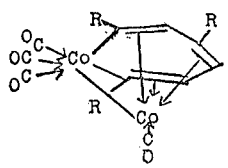

$Co_2(CO)_6(RC_2H)_4Hg$, wherein R represents a tertiary butyl or trimethylsilyl group. This complex may be represented by the following structure:

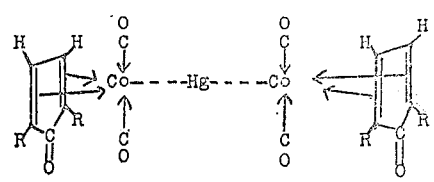

$Co_2(CO)_6(RC_2H)_4$, wherein R represents a tertiary butyl or trimethylsilyl group. This complex may be represented by the following structure:

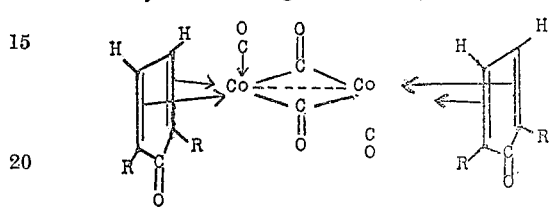

$Co_3(CO)_9H(RC_2H)$, wherein R represents a phenyl group. This complex may be represented by the following structure:

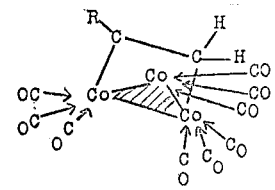

$Ni(CO)_2(RC_2R')_4$, wherein R and R' represent phenyl groups. This complex may be presented by the following structure:

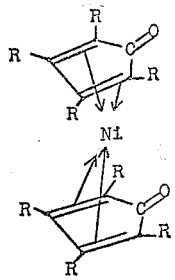

and, $Mo_2(CO)_4(\phi C_2 \phi)_5$

Other useful organo-metallic complexes are those in which the transition metal is ruthenium, rhodium, palladium, osmium, iridium, platinum, manganese, rhenium, chromium or tungsten, or are those in which the carbonyl group bonded to the metal is partially replaced by a nitrosyl, a substituted stibine, a substituted arsine, or a substituted phosphine.

The organo-metallic complexes employed as starting materials in the present invention may be conveniently prepared by the process described in copending application 707,111, entitled "Organo-Metallic Compounds and Method for Their Preparation," filed January 6, 1958, in the name of Karl Walter Hubel, the description thereof being incorporated herein by reference, and its continuation-in-part Serial No. 219,102, filed August 24, 1962, both of which are owned by an assignee common with the instant application.

Briefly stated, the organo-metallic complexes can be prepared by reacting an acetylenic compound with a metal carbonyl in a non-aqueous neutral medium at a temperature of between room and 300° C. As a consequence, a stable organo-metallic carbonyl reaction product is formed. The acetylenic reactant has the formula:

$R'C \equiv CR''$ wherein R' and R" represent a substituent selected from the group consisting of hydrogen, an organic group, and substituted derivatives thereof, a functional group and substituted derivatives thereof and an organo-substituted hydride group, the substituent being substantially inert to and inactive with the carbonyl group. The metals of the metal carbonyl group are selected from the group consisting of iron, nickel, ruthenium, rhodium, palladium, osmium, iridium, platinum, manganese, rhenium, chromium, molybdenum, cobalt and tungsten.

For the process of this invention any halogenation reagent may be employed as a reactant with the organometallic complex. Exemplary of such reagents are halogens and halogen-containing compounds such as $SO_2Cl_2$, $SOCl_2$, $SF_4$, phosphor halides, phosphoryl halides, bromo-succinamide and mixed-halogen containing compounds. However, for the practice of this invention, it is preferable to employ bromine and chlorine.

The process of this invention can be carried out using stoichiometric amounts of the starting materials. However, it has been found that an excess of the halogenation reactant is generally preferable. The reaction is usually carried out in an organic solvent such as carbon tetrachloride or benzene and the like. However, for the practice of this invention it is preferred that the solvent be substantially inert to the reaction.

The reaction is usually achieved by heating the reaction mixture to a temperature of between $-30°$ C. and $150°$ C. It is preferable, however, to carry out the invention at a relatively low range of temperature, i.e. between $0°$ C. and room temperature. Of course, the specific temperatures employed will depend upon the nature of the reactants employed. It is preferable to perform the reaction in a closed system whenever one of the reactants, or the reaction products formed thereby or the solvents employed, are too volatile at the reaction temperatures.

The reaction is usually completed within a few hours although longer reaction times may be necessary in some instances. The reaction products are easily removable from the reaction mixture after completion of the reaction using any suitable technique. The technique of removal will of course vary according to the nature of the reaction product and the occurrence of side reactions. Suitable process conditions will be further illustrated in the specific examples hereinafter described relating to the present invention.

Typical compounds prepared by the process of this invention may be illustrated by the following general formulae:

(A)

(B)

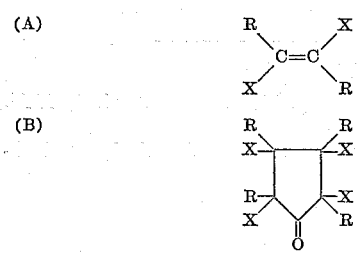

wherein R represents hydrogen, or hydroxyl, carboalkoxy, halogeno, alkyl, aryl, cycloaliphatic, alkoxy or silyl groups including the substituted derivatives thereof, and X represents a halogen atom. These compounds are by way of illustration only. The halogenated compounds produced by this invention will also include many other representative linear or cyclic types of compounds. Generally speaking, the halogenated compounds formed by the process of this invention will contain at least one ($R'C_2R"$) unit wherein R' and R" have the meanings previously defined.

Typical organic compounds produced by the process of this invention include:

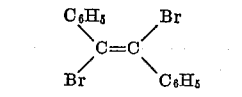

α,β-Dibromostilbene

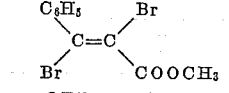

α,β-Dibromocinnamate $C_6H_5$—$CBr_2$—$CH_2Br$

α,α,β-Tribromoethylbenzene

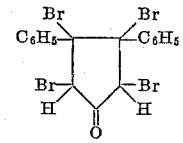

3,4-diphenyl-2,3,4,5-tetrabromocyclopentanone

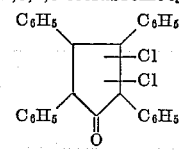

Dichloro-tetraphenyl-cyclopentanone

The invention may be further illustrated by the following examples.

Example I

To a solution of 0.1 gram $Co_2(CO)_6(C_6H_5C_2C_6H_5)$ in 30 ml. $CCl_4$, a solution of $Br_2$ in $CCl_4$ (conc.: 10%) at room temperature was slowly added, until the red color disappeared. A voluminous green precipitate of $CoBr_2$ separated out while CO was evolved. The filtered reaction mixture was brought to dryness. Trans-α,β-dibromostilbene (M.P. 203°) was obtained in a good yield.

Example II

Following the procedure of Example I, but employing $Co_2(CO)_6(C_6H_5C_2COOCH_3)$ and bromine in $CCl_4$, methyl α,β-dibromocinnamate was obtained in a good yield.

Example III

Following the procedure of Example I, but employing 0.15 gram (0.25 mM) $Co_4(CO)_{10}(C_6H_5C_2C_6H_5)$, there was obtained 0.05 gram trans-α,β-dibromostilbene.

Example IV

To a solution of 1 gram (0.84 mM)

$Mo_2(CO)_4(C_6H_5C_2C_6H_5)_5$ in 100 ml. $CCl_4$ there was added dropwise at room temperature, 40 ml. of a 0.5 molar bromine solution in $CCl_4$. After 2 hours, the solution was evaporated, the residue was dissolved in benzene and water is added. From the organic layer there was separated by chromatography, 0.2 gram (0.59 mM) trans-α,β-dibromo-stilbene (M.P. 210° C.) and 0.3 gram trans-α,β-dibenzoyl-stilbene. As a side product, 0.12 gram tetraphenyl-cyclopentadienone was also obtained.

Example V

A solution of 8.65 grams (16.3 mM)

$Co_3(CO)_9H(C_6H_5C_2H)$ in 100 ml. $CCl_4$ was treated dropwise at 0° C. with a solution containing 9.6 grams (60 mM) bromine in 100 ml. $CCl_4$. The deep red color disappeared while $CoBr_2$ separated out. The filtered solution was brought to dryness thereby giving an oil which crystallized on cooling.

Recrystallization from dilute methanol yielded 1.86 grams (33.5%) of tribromo-ethylbenzene of M.P. 48–49° C.

ANALYSIS

|   | Found | Theoretical, Calculated for $C_8H_7Br_3$ |
|---|---|---|
| C | 28.29 | 28.20 |
| H | 2.17 | 2.06 |
| Br | 71.32 | 69.92 |

The M.P. and I.R. spectrum show that this product differs from the known $\alpha,\beta,\beta$-tribromo-ethylbenzene (M.P. 36° C.); it is assumed to be the $\alpha,\alpha,\beta$-tribromo-ethylbenzene, $C_6H_5$—$CBr_2$—$CH_2Br$.

*Example VI*

Following the procedure of Example V, 3 grams (5 mM) $Co_4Hg_2(CO)_{12}(C_6H_5C_2H)_2$ in 50 ml. $CCl_4$ was reacted with bromine at room temperature. A colorless product was obtained which melted and decomposed at 115–140° C.

ANALYSIS

|   | Found | Theoretical, Calculated for $C_{17}H_{12}Br_4O$ |
|---|---|---|
| C | 37.39 | 36.90 |
| H | 2.18 | 2.19 |
| O | 3.44 | 2.90 |

This product is assumed to be identical to the known 3,4-diphenyl-2,3,4,5-tetrabromo-cyclopentanone.

*Example VII*

At room temperature, chlorine was bubbled through a benzene solution containing 2 grams

$Fe_2(CO)_6(C_6H_5C_2C_6H_5)_2$

After the reaction, iron salts were removed by water. The organic layer yielded by chromatography, 0.27 gram dichloro-tetraphenyl-cyclopentenone of M.P. 188° C.

The compounds produced by the process of this invention have art-recognized utility or will serve as intermediates in the production of compounds having a wide range of art-recognized utility.

For example, when completely halogenated, compounds produced by the process of this invention are excellent solvents for certain types of organic reactions. They are also very useful in the production of tetrachloroethylene. They are also useful in the production of substituted acetylenes.

The cyclic halogenated structures produced by the process of this invention have insecticidal activity. Both the linear and the cyclic structures, moreover, are useful in the production of polymers which are stable and inert to high temperature and chemical conditions.

What is claimed is:

1. A process for the preparation of halogenated linear and cyclic organic compounds free of carbon to metal bonds, which comprises reacting an organo-metallic complex having the formula: $M_x(CO)_y(R'C_2R'')_z(B)_w$ wherein M is a transition metal of groups VI, VII and VIII of the periodic table, $(R'C_2R'')_z$ represents at least one moiety bonded to M by at least one carbon to metal bond, $C_2$ represents two carbons bonded to each other, R' and R'' represent monovalent groups selected from the group consisting of hydrogen, halogeno, carboalkoxy, alkyl, aryl, cycloaliphatic hydrocarbon groups, alkoxy and silyl, CO represents carbonyl bonded to one of the class consisting of M and $C_2$, B represents a group bonded to one of the class consisting of M and $C_2$ and is selected from the group consisting of hydrogen, mercury, halogen, alkyl, aryl, and acyl, $x$ represents an integer of from 1 to 4, $y$ represents an integer of from 1 to 10, $z$ represents an integer of from 1 to 6, and $w$ represents an integer of from 0 to 4, with a halogenation reagent whereby the carbon to metal bond between M and the moiety $(R'C_2R'')_z$ in said complex is broken and halogen is added to the $(R'C_2R'')_z$ moiety to form said halogenated organic compounds free of carbon to metal bonds, and recovering said halogenated organic compounds thus formed.

2. A process as claimed in claim 1, in which the metal of the organo-metallic complex is iron.

3. A process as claimed in claim 1, in which the metal of the organo-metallic complex is cobalt.

4. A process as claimed in claim 1, in which the metal of the organo-metallic complex is nickel.

5. A process as claimed in claim 1, in which the metal of the organo-metallic complex is molybdenum.

6. A process as claimed in claim 1, in which the halogenation reagent is bromine.

7. A process as claimed in claim 1, in which the halogenation reagent is chlorine.

8. A process as claimed in claim 1, in which a stoichiometric excess of the halogenation reagent is employed.

9. A process as claimed in claim 1, in which an inert organic solvent is employed.

10. A process as claimed in claim 1, in which the reaction is carried out at a temperature of between —30° C. and 150° C.

References Cited in the file of this patent

UNITED STATES PATENTS 3,096,265     Hubel et al. _____ July 2, 1963

FOREIGN PATENTS 229,362     Australia _____ July 17, 1958

OTHER REFERENCES

Piper et al.: Jour. Inorg. Nucl. Chem., vol. 3, 1956, pp. 104–24.

Hubel et al.: "Jour. Inorg. Chem.," vol. 9, pp. 204–210 (March 1959).